US011927949B2

(12) United States Patent
Yang

(10) Patent No.: US 11,927,949 B2
(45) Date of Patent: Mar. 12, 2024

(54) METHOD FOR ANOMALY CLASSIFICATION OF INDUSTRIAL CONTROL SYSTEM COMMUNICATION NETWORK

(71) Applicant: Zhejiang University, Hangzhou (CN)

(72) Inventor: Qiang Yang, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 242 days.

(21) Appl. No.: 17/429,307

(22) PCT Filed: Apr. 23, 2021

(86) PCT No.: PCT/CN2021/089288
§ 371 (c)(1),
(2) Date: Aug. 6, 2021

(87) PCT Pub. No.: WO2022/057260
PCT Pub. Date: Mar. 24, 2022

(65) Prior Publication Data
US 2022/0269258 A1 Aug. 25, 2022

(30) Foreign Application Priority Data
Sep. 15, 2020 (CN) .......................... 202010967322.9

(51) Int. Cl.
G05B 23/02 (2006.01)
(52) U.S. Cl.
CPC ................................ G05B 23/0275 (2013.01)
(58) Field of Classification Search
None
See application file for complete search history.

(56) References Cited

U.S. PATENT DOCUMENTS

2017/0017735 A1  1/2017  Srinivasan et al.
2018/0024511 A1* 1/2018  Wang ..................... G05B 13/04
                                                           700/29
(Continued)

FOREIGN PATENT DOCUMENTS

CN      103684910 A     3/2014
CN      107517205 A     12/2017
(Continued)

OTHER PUBLICATIONS

Kao et al. 'Anomaly Detection for Univariate Time Series with Statistics and Deep Learning', 2019 IEEE Eurasia Conference on IOT, Communication and Engineering (ECICE), pp. 404-407. IEEE, published 2019.*
(Continued)

Primary Examiner — Bernard G Lindsay
(74) Attorney, Agent, or Firm — Goodhue, Coleman & Owens, P.C.

(57) ABSTRACT

The present disclosure provides a method for anomaly classification for an industrial control system (ICS) communication network based on statistical learning and deep learning. This method designs LSTM deep learning structure parameters and performs modeling analysis based on a large amount of traffic data during normal operation of the ICS communication network; based on real-time communication traffic data thresholds generated by a SARIMA online statistical learning model, designs correlated algorithms to analyze a numerical relationship between background traffic and real-time traffic; and classifies ICS communication network anomalies according to an ICS network anomaly classification algorithm. In the present disclosure, an ICS test network range involving virtual and physical devices and a test platform in Zhejiang Province are used for experimental analysis, a physical simulation platform is built in a laboratory environment for validation, and detailed (Continued)

examples are provided to verify the reliability and accuracy of the algorithm.

5 Claims, 7 Drawing Sheets

(56) References Cited

U.S. PATENT DOCUMENTS

| | | | |
|---|---|---|---|
| 2018/0157933 A1* | 6/2018 | Brauer | G06F 18/24143 |
| 2018/0219895 A1* | 8/2018 | Silver | G06N 3/084 |
| 2019/0093187 A1* | 3/2019 | Lee | G06N 3/08 |
| 2019/0280942 A1* | 9/2019 | Côté | H04W 24/08 |
| 2019/0303726 A1* | 10/2019 | Côté | G06N 20/20 |
| 2020/0076840 A1* | 3/2020 | Peinador | G06F 21/552 |
| 2020/0210393 A1* | 7/2020 | Beaver | G06F 16/215 |
| 2021/0065031 A1* | 3/2021 | Parikh | G06F 16/906 |
| 2022/0004897 A1* | 1/2022 | Jadon | G06N 3/084 |

FOREIGN PATENT DOCUMENTS

| | | |
|---|---|---|
| CN | 110730099 A | 1/2020 |
| CN | 111431937 A | 7/2020 |
| CN | 112202736 A | 1/2021 |
| EP | 3528463 A1 | 8/2019 |

OTHER PUBLICATIONS

Nediyanchath et al. 'Anomaly Detection in Mobile Networks' 2020 IEEE Wireless Communications and Networking Conference Workshops (WCNCW) Apr. 6, 2020 (pp. 1-5) IEEE.*

Holm et al. 'Cloud-Based Business Intelligence for a Cellular IoT Network' 2019 IEEE Africon, pp. 1-8. IEEE, published 2019.*

Kromkowski et al. 'Evaluating Statistical Models for Network Traffic Anomaly Detection' 2019 systems and information engineering design symposium (SIEDS), pp. 1-6. IEEE, published 2019.*

International Search Report, PCT/CN2021/089288, dated Jul. 21, 2021, 4 Pages.

* cited by examiner

METHOD FOR ANOMALY CLASSIFICATION OF INDUSTRIAL CONTROL SYSTEM COMMUNICATION NETWORK

CROSS REFERENCE TO RELATED APPLICATION

This application claims priority to the Chinese Patent Application No. 2020109673229, filed with the China National Intellectual Property Administration (CNIPA) on Sep. 15, 2020, and entitled "METHOD FOR ANOMALY CLASSIFICATION OF INDUSTRIAL CONTROL SYSTEM COMMUNICATION NETWORK BASED ON STATISTICAL LEARNING AND DEEP LEARNING", which is incorporated herein by reference in its entirety.

TECHNICAL FIELD

The present disclosure relates to the technical field of industrial information security detection, and in particular, to a method for anomaly classification of an industrial control system (ICS) communication network.

BACKGROUND ART

Key infrastructures such as energy, refining, and transportation are critical for a country's stable development, and ensuring network security of the key infrastructures is the top priority. With the automation, interconnection and intelligence of national large-scale infrastructure equipment (such as smart substations, intelligent chemical engineering process systems, and distributed industrial control systems), the cyberspace security issues are becoming apparent. In recent years, a series of cyber attacks on national critical infrastructure have caused huge losses to the national economy and irreversible damage to society. Top hackers frequently invade the communication networks of hub substations, process industrial systems, and even nuclear power plants in more concealed, efficient, and destructive intrusion ways. At present, the defense and hardening of national critical infrastructure network systems have been escalated to the national strategic level. Communication traffic analysis is recognized as the most promising solution to industrial system security problems. The intelligent analysis of communication traffic is a solution that organically combines the security solutions in the traditional Internet field with the characteristics of modern power communication networks and industrial control systems. Specifically, network anomaly events are extracted by using the traffic analysis technology during operation of industrial control systems, are accurately positioned, qualitatively and quantitatively analyzed through statistical learning and deep learning, and are further classified in terms of principle and structure.

According to related reports and papers, all attacks on industrial systems can be reflected on the communication network. Most industrial control network attacks may cause damage to the related communication network. The degree and location of network damage vary with attack types. "Blackenergy"-oriented combined attacks and a series of malicious code injections may cause the communication network to be paralyzed, key channels to be blocked, the supervisory control and data acquisition (SCADA) system to be manipulated, and the control system to be delayed in recovery or even shut down. Since ICS data traffic presents different traffic patterns and characteristics similar to Internet traffic, mathematical models can be generated to analyze, develop, and interpret the characteristics of the ICS data traffic. For complex time series like ICS data traffic, regression algorithms are generally used for modeling and statistical analysis. For anomaly analysis and event classification of the ICS communication network, traditional machine learning algorithms are generally used for offline analysis and modeling of anomaly events. However, the existing ICS anomaly detection algorithms cannot accurately locate real-time anomalies and have a high false positive rate. The existing ICS anomaly event classification models have the defects of high algorithm complexity, poor interpretability, and low classification accuracy.

SUMMARY

To implement dynamic modeling and anomaly classification and detection of real-time collected ICS communication traffic without priori knowledge, the present disclosure proposes a comprehensive analysis method to resolve the problem that the existing classification and detection algorithms for ICS anomaly events cannot be actually deployed due to the excessive rely on priori knowledge, low classification accuracy, and high algorithm complexity. The present disclosure also design an ICS network anomaly classification model based on statistical learning and deep learning, which is helpful for the network security protection and anomaly detection of major national industrial infrastructures.

The objectives of the present disclosure can be achieved by the following technical solutions:

A method for anomaly classification of an ICS communication network includes the following steps:

1) collecting, by a monitoring host of an ICS communication network, communication traffic data in real time from an industrial switch in the ICS communication network, and storing, by an industrial server, the real-time collected communication traffic data;

2) based on normal traffic data of the ICS communication network, designing LSTM deep learning model structure parameters and performing modeling, to generate an offline LSTM deep learning model and store it on the industrial server;

3) performing online detection by using multiple short-cycle SARIMA models:

running multiple short-cycle SARIMA(p, d, q)×(P, D, Q)$_s$ statistical learning models in a distributed manner, generating an online threshold interval of communication traffic in real time, and obtaining a sequence of ICS communication network traffic that exceeds the online threshold, including a short-cycle SARIMA model training set with the anomaly, and an online monitoring data set, obtained from the training set, for comparing upper and lower bounds of an online threshold with the threshold interval;

4) identifying background traffic of the ICS communication network by using an online long short-term memory (LSTM) model:

using the short-cycle SARIMA model training set with the anomaly as input of the stored LSTM deep learning model, and outputting a corresponding forecast sequence online;

5) designing an abnormal-traffic classifier and performing numerical statistics and calculation to classify ICS communication network anomalies.

The present disclosure addresses the issue of anomaly detection and classification of the ICS communication network; and provides a network anomaly event classification method based on statistical learning and deep learning that is helpful for ICS network security protection. The ICS network anomaly classification method can monitor network traffic in real time and quickly analyze network anomaly events. The method also provides real-time and accurate source location of anomaly events for typical ICS systems, and detailed analysis of impacts and types of the anomaly events, thereby providing decision support for future network optimization, network adjustment, network construction, and network security protection. In the early stage, accurate and reliable real-time modeling is performed based on the actually collected ICS communication network traffic, and intelligent anomaly classification and detection are performed for different network anomaly events at a traffic level by using combined algorithms, thereby achieving intrusion detection, classified security protection, and security situation awareness for the ICS. The present disclosure can efficiently and accurately defend against typical network attacks on the ICS, and significantly improve margins for system protection against typical network anomalies.

Based on characteristics of ICS communication network traffic, the present disclosure deeply combines the existing SARIMA statistical learning model and LSTM deep learning model. In the early stage, through distributed short-cycle SARIMA modeling for the real-time collected ICS communication traffic data, real-time threshold intervals are generated efficiently and stably. Based on the threshold intervals and ICS network background traffic forecast sequences generated by the LSTM deep learning model, the designed ICS network anomaly classification method can quickly and accurately classify and trace real-time ICS anomaly events, implementing analysis after anomaly detection of ICS network traffic. In this way, real-time situation awareness, warning, and security protection upgrade are finally realized for the ICS network. In the present disclosure, ICS communication traffic data is collected from an ICS test network range involving virtual and physical devices, and an industrial control test platform in Zhejiang Province, and modeling analysis is performed to build a distributed short-cycle SARIMA model with appropriate parameters. Based on statistical learning, an optimized SARIMA$(p,d,q) \times (P,D,Q)_s$ model is used to calculate a normal traffic threshold interval of the ICS, and adaptability of the model is analyzed. Based on deep learning, the LSTM model is used to perform offline training and modeling analysis based on a large amount of ICS network background traffic data, with a short-cycle SARIMA model training set with an anomaly event as the input. A well-trained LSTM model can use the input to online output forecast values of the ICS network background traffic under the current anomaly event. Dynamic analysis of the real-time collected ICS network traffic is performed by using custom and adaptable combined anomaly classification algorithms, to finally achieving classification and source tracing of the ICS anomaly events. The present disclosure has been deployed in an ICS of a chemical group in Zhejiang Province, achieving an extremely short algorithm running time, a high detection rate, and a low false positive rate.

BRIEF DESCRIPTION OF THE DRAWINGS

The present disclosure will be explained in detail with reference to the accompanying drawings.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An existing machine learning-based offline classification method cannot dynamically analyze collected ICS communication traffic in real time or trace a source of an anomaly event. Only a type of the anomaly event is returned finally. Since the source of ICS anomaly events cannot be traced, operation and maintenance personnel cannot conduct real-time situation awareness and warning for the ICS network or take network defense measures for security audit and hardening.

The present disclosure aims to provide a method for anomaly classification of an ICS communication network. This SARIMA statistical learning and LSTM deep learning based method can dynamically generate normal traffic thresholds for real-time collected ICS data traffic, and perform integrated computation on currently collected ICS data traffic, dynamic normal traffic threshold intervals, static background traffic forecast values, traffic filtered by a Berkeley filter, and time of whitelisted events by using a combined classification algorithm, to quickly and accurately classify and trace real-time ICS abnormal events and analyze ICS network traffic after anomaly detection. In this way, real-time situation awareness, warning, and security protection upgrade are finally realized for the ICS network.

The present disclosure will be described in detail with reference to the drawings, to make the objectives and effects of the present disclosure clearer.

Embodiment 1

Figure 1:
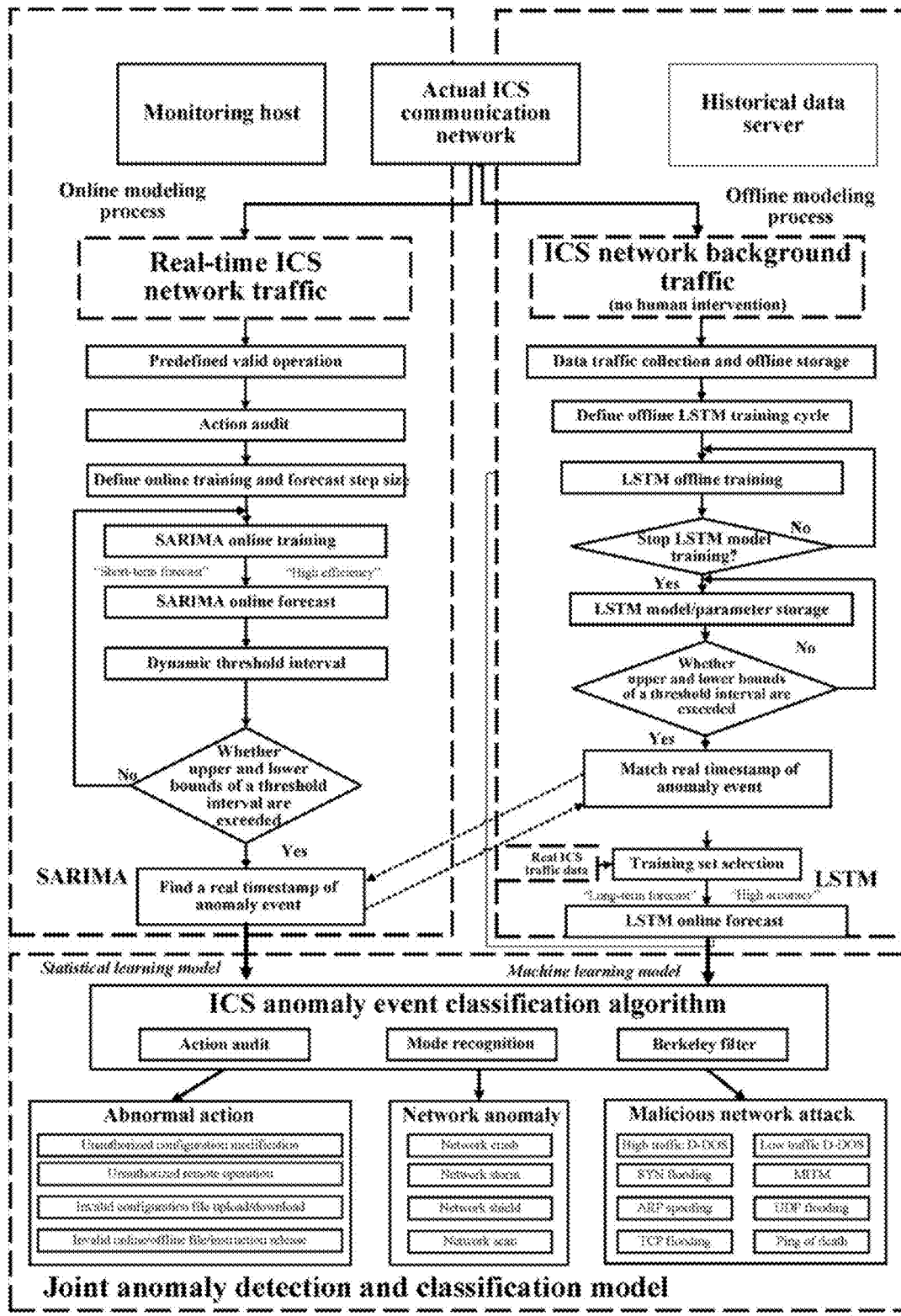
FIG. 1 is a flowchart of a method according to an embodiment of the present disclosure.
Figure 2:
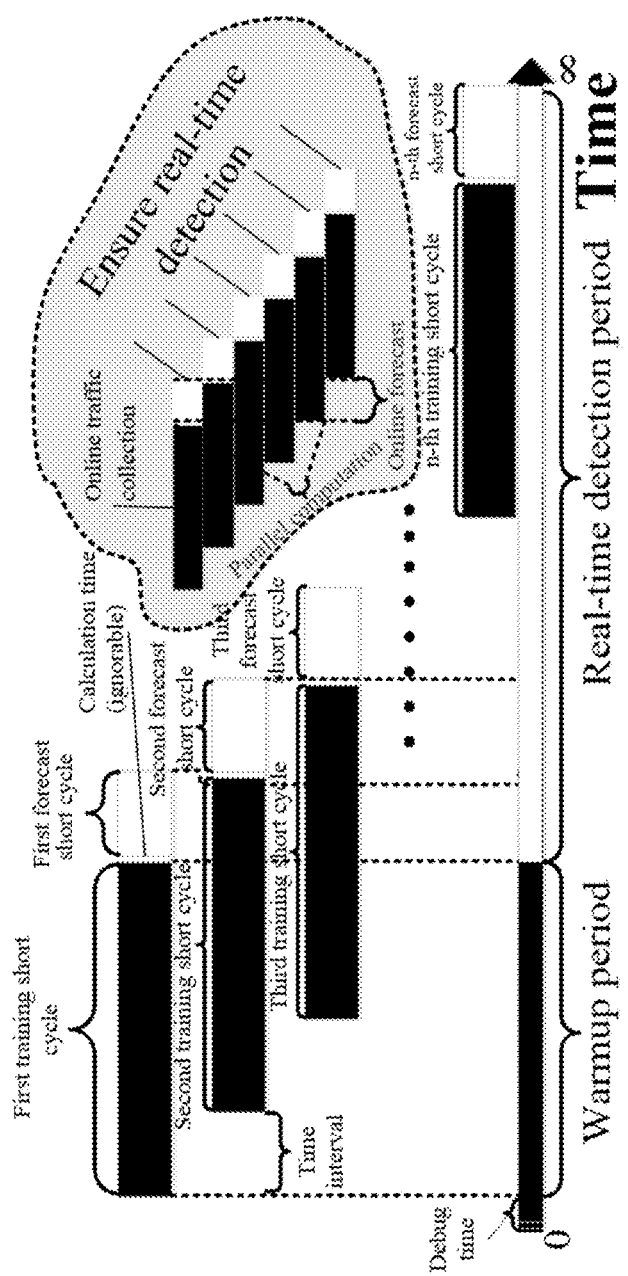
FIG. 2 is an effect drawing for building a test platform according to an embodiment of the present disclosure.

Referring to FIG. 1 and FIG. 2, this embodiment builds an ICS network test platform that conforms to an experimental environment, based on communication traffic collected from an ICS test network range involving virtual and physical devices in Zhejiang University. The platform is equipped with an industrial programmable logic controller (PLC), an industrial Ethernet switch, and an industrial control host computer. The host computer communicates with the PLC over TCP/IP. The PLC communicates with field devices over the industrial Modbus protocol. Actual ICS communication network traffic is collected and stored, and characteristics of the traffic are analyzed offline. A traffic probe is deployed on the industrial switch between the industrial control host computer and the PLC. Traffic types include partial traffic on a single switch port and full traffic on a switch mirror port. According to an overall algorithm flowchart in FIG. 1, in the early stage of the experiment, frill traffic data on a mirror port is modeled and analyzed, and dynamic threshold modeling and anomaly detection are performed on real-time collected ICS communication traffic data by using a distributed short-cycle SARIMA model. In the late stage, forecast modeling is performed on ICS network background traffic by using an LSTM deep learning algorithm, and source tracing and classification of ICS network anomaly events are performed by using a combined classification algorithm.

Figure 3:
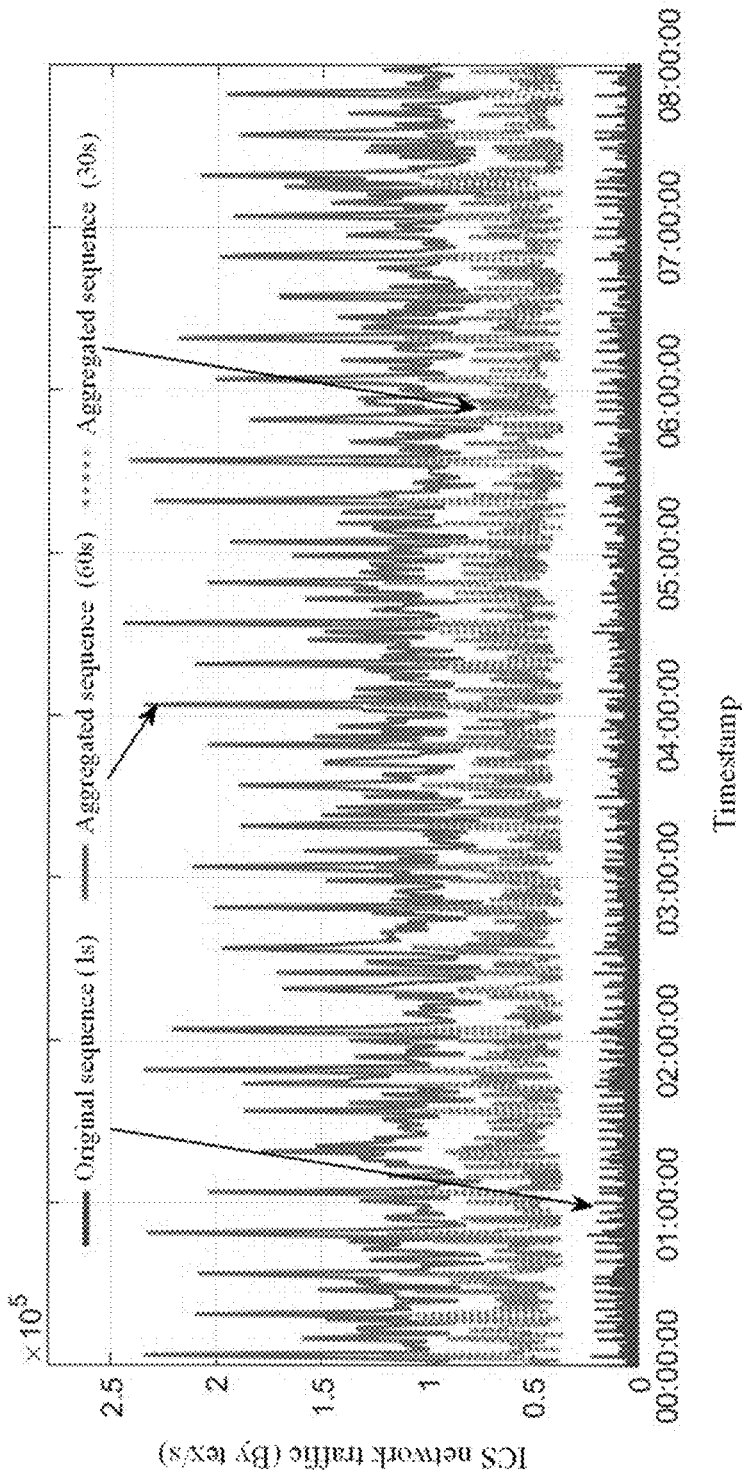
FIG. 3 is a schematic diagram of multiple short-cycle iterations during online detection according to an embodiment of the present disclosure.

Without any human operation and intervention, a total of Pcap data packets in the normal ICS communication network were captured in this experiment. During the operation time of about 20 hours, there was no packet loss. In addition, Pcap background traffic data packets of the ICS communication network were captured. During the operation time of about 20 hours, the background traffic data packets were communication traffic captured in a case that all devices in the ICS were in standby mode, the host computer and the monitoring host stay in communication, and there is no human operation or intervention. The specific details of the ICS communication network traffic are shown in FIG. 3, where aggregation scales of normal ICS traffic are 1 s, 30 s, and 60 s.

Based on the overall process of the method shown in FIG. 1, a method for anomaly classification of an ICS communication network includes the following steps.

1) Deploy an industrial switch, a monitoring host, a test host, and an industrial server in an ICS communication network, where the monitoring host collects communication traffic data in real time from the industrial switch, and the industrial server stores the real-time collected communication traffic; and build an ICS network test platform, where the test platform includes an attack injection platform and an ICS network security platform. Details about how to build the ICS network test platform are shown in FIG. 2.

2) Based on a large amount of normal traffic data of the ICS communication network, design LSTM deep learning model structure parameters and perform modeling, to generate an offline LSTM deep learning model and store it on the industrial server.

Figure 4:
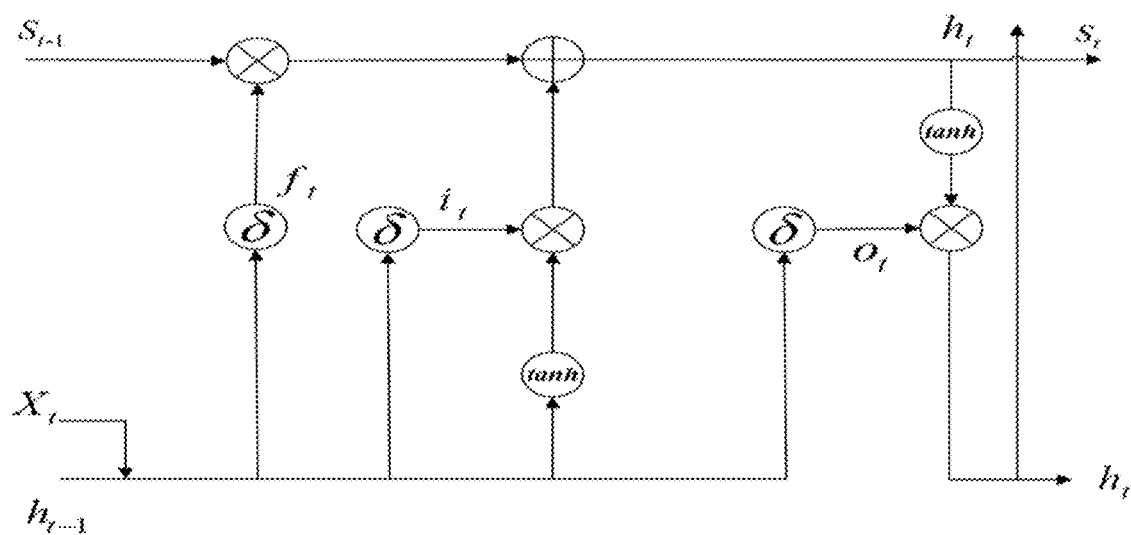
FIG. 4 is a block diagram of an LSTM deep learning algorithm according to an embodiment of the present disclosure.

2.1) According to LSTM algorithm principles shown in FIG. 4, an LSTM deep learning algorithm employs a control gate mechanism, including memory cells, an input gate, an output gate, and a forget gate. A forward calculation method may be expressed as follows:

$$g_t^{(l)} = \psi(W_{gx}^{(l)} h_t^{(l-1)} + W_{gh}^{(l)} h_{t-1}^{(l)} + b_g^{(l)})$$

$$i_t^{(l)} = \delta(W_{ix}^{(l)} h_t^{(l-1)} + W_{ih}^{(l)} h_{t-1}^{(l)} + b_i^{(l)})$$

$$f_t^{(l)} = \delta(W_{fx}^{(l)} h_t^{(l-1)} + W_{fh}^{(l)} h_{t-1}^{(l)} + b_f^{(l)})$$

$$o_t^{(l)} = \delta(W_{ox}^{(l)} h_t^{(l-1)} + W_{oh}^{(l)} h_{t-1}^{(l)} + b_o^{(l)})$$

$$s_t^{(l)} = g_t^{(l)} \odot i_t^{(l)} + s_{t-1}^{(l)} \odot f_t^{(l)}$$

$$h_t^{(l)} = \psi(s_t^{(l)}) \odot o_t^{(l)}$$

W is a weight matrix, and b is a weight vector, used to establish connections at an input layer, a memory layer, and an output layer. $s_t^{(l)}$ represents a state of a memory cell in the t-th step of the l-th layer, and $h_t^{(l)}$ represents an output state of the memory cell in the t-th step of the l-th layer. $\delta$ is an activation function, $\psi$ is a tanh function. $\odot$ is a Hadamard product between sets. i, o, and f represent the input gate, the output gate, and the forget gate, respectively. g represents an input node of the tanh function.

2.2) A simplified LSTM deep learning model function based on an ICS communication network traffic time series is as follows:

$$\text{Model}_{LSTM} \leftarrow f_{LSTM}(X'_{N_{trai}}, N_{fore}, \text{Para}\square)$$

$f_{LSTM}(\ )$ is the simplified LSTM deep learning model function. This function uses a training sequence $X'_{N_{trai}}$ of a large amount of ICS normal communication traffic for model adaptation and training. Para$\square$ represents a structure parameter set of the LSTM deep learning model, $N_{fore}$ represents a forecast sequence length of the LSTM deep learning model, and $N_{trai}$ represents a predefined training sequence length. Through the model training, the offline LSTM deep learning model can generate, based on the appropriate LSTM structure parameter and the training set $X'_{N_{trai}}$, an LSTM model reflecting normal ICS communication network traffic.

Figure 5:
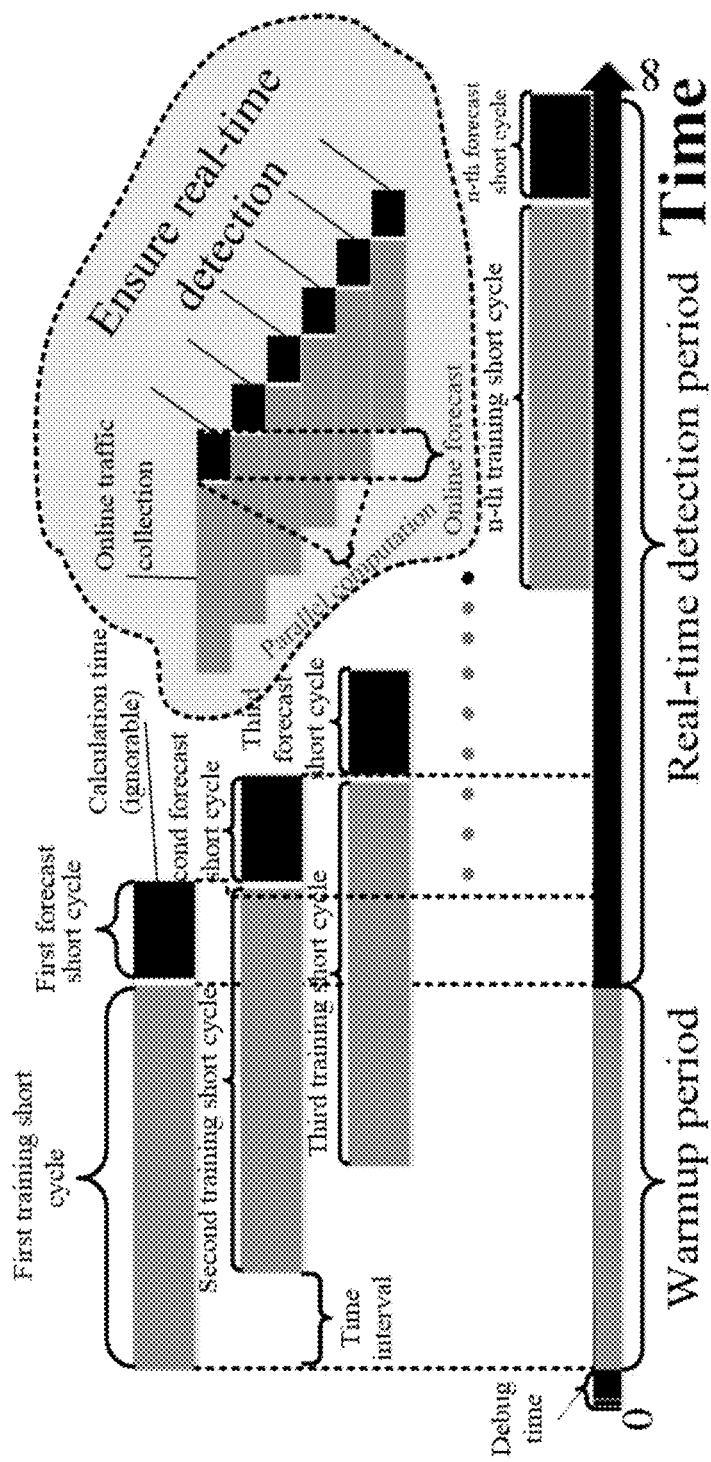
FIG. 5 is a schematic diagram of multiple short-cycle iterations of a distributed SARIMA statistical learning algorithm according to an embodiment of the present disclosure.

3) As shown in FIG. 5, nm multiple short-cycle SARIMA (p, d, q)×(P, D, Q)$_s$ statistical learning models in a distributed manner, generate an online threshold interval of communication traffic in real time, and obtain a sequence of ICS communication network traffic that exceeds the online threshold, including a short-cycle SARIMA model training set with the anomaly, an online monitoring data set, and upper and lower bounds of the online threshold.

3.1) Based on a selected traffic aggregation scale and a short-cycle analysis scale, generate a SARIMA(p,d,q)×(P,D,Q)$_s$ time series by using a SARIMA(p,d,q)×(P,D,Q)$_s$ sequence definition method.

The SARIMA(p,d,q)×(P,D,Q)$_s$ model is obtained by separately performing d-order difference calculation and D-order seasonal difference calculation on an auto regressive moving average ARMA(p,q) model, where the ARMA(p,q) model is a combination of AR(p) and MA(q) models.

The ARMA(p,q) model is defined as follows:

$$X_t = \phi_1 X_{t-1} + \phi_2 X_{t-2} + \ldots + \phi_p X_{t-p} + \varepsilon_t - \theta_1 \varepsilon_{t-1} - \ldots - \theta_q \varepsilon_{t-q}$$

In the foregoing formula, $X_t$ represents a short-cycle stationary time series after averaging, with a relatively short length; $\phi_p$ represents a coefficient of an auto regressive term AR; $\theta_q$ represents a coefficient of a moving average term MA; $\varepsilon_t$ represents a random error term; p represents an order number of AR; and q represents an order number of MA.

Define a delay operator B, and let $BX_t = X_{t-1}$ such that an AR coefficient polynomial is $\Phi(B) = 1 - \phi_1 B - \ldots - \phi_p(B)^p$ and an MA coefficient polynomial is $\Theta(B) = 1 - \theta_1 B - \ldots - \theta_q(B)^q$.

Introduce a difference operator $\Delta^d = (1-B)^d$. Then the ARIMA(p, d, q) model is expressed as follows:

$$\Phi(B) \Delta^d X_t = \Theta(B) \varepsilon_t$$

The SARIMA model is obtained by performing seasonal difference calculation on the ARIMA model. The SARIMA model is defined as follows:

$$\Phi_p(B) \Phi_p(B^s) \Delta^d \Delta_s^D X_t = \Theta_q(B) \Theta_Q(B^s) \varepsilon_t$$

$\varepsilon_t$ represents a white noise sequence, d represents an order number of a trend difference, D represents an order number of a seasonal difference compensated based on cycle s, $B^s$ represents an s-order delay operator, $\Delta_s^D$ represents a seasonal difference operator, $B^s X_t = X_{t-s}$, $\Delta_s^D = 1 - B^s$, $\Phi_p(B^s)$ is a Q-order polynomial of $B^s$, and $\Phi_p(B^s)$ is a P-order polynomial of $B^s$.

3.2) Use Bayesian Information Criterion (BIC) to supervise, analyze, and determine p, d, q, P, D, and Q orders of the SARIMA(p, d, q)×(P, D, Q)$_s$ model.

3.3) Use the least square method to estimate a p-order coefficient $\phi_k$(k=1,2, ..., p), a q-order coefficient $\theta_k$(k=1,2, ..., q), a seasonal P-order coefficient $\phi_k^s$(k=s,2·s, ..., P·s), and a seasonal Q-order coefficient $\theta_k^s$(k=s,2·s, ..., Q·s) of SARIMA(p, d, q)×(P, D, Q)$_s$.

3.4) Use the SARIMA(p, d, q)×(P, D, Q)$_s$ model under the optimal BIC to perform fitting analysis on the original sequence, and perform residual testing; and if a residual is white noise, perform inverse filtering on a fitted sequence to obtain a fitted value or a forecast value of the original sequence; or if the residual is not white noise, use the BIC to determine orders of the ARMA(p, q) model.

3.5) Obtain a mathematical expression of the short-cycle SARIMA(p, d, q)×(P, D, Q)$_s$ model.

3.6) Collect real-time traffic data from the ICS industrial switch, and generate a time series based on a specified sampling frequency $\gamma_{samp}$ and an aggregation scale, with a short cycle as an iterative cycle.

3.7) Perform training based on the real-time collected traffic data, perform SARIMA(p, d, q)×(P, D, Q)$_s$ model training and adaptation in a short cycle, and then output an optimal model and parameters adapted to the optimal model, where a model in the i-th short cycle is defined as follows:

$$\hat{X}_{T_{fore}}^{(i)} = f_{SARIMA}(X_{T_{trai}}^{(i)}, T_{fore}, s, \text{'BIC'})$$

$f_{SARIMA}()$ is a functional expression of the SARIMA(p, d, q)×(P, D, Q)$_s$ model $X_{T_{trai}}^{(i)}$ is a short-cycle training set for the i-th iteration, $T_{fore}$ is the number of forecast sequences in the short cycle, s is a periodic parameter, 'BIC' is a criterion for selecting optimal (p, d, q, P, D, Q) parameters based on econometrics, and $\hat{X}_{T_{fore}}^{(i)}$ is a time series forecast by the SARIMA model during the i-th iteration.

Calculate a forecast average $\hat{\mu}^{(i)}$ of the i-th iteration:

$$\hat{\mu}^{(i)} = \frac{1}{T_{fore}} \cdot \sum_{k=1}^{T_{fore}} \hat{X}_k^{(i)}$$

3.8) Run the short-cycle SARIMA(p, d, q)×(P, D, Q)$_s$ model in a distributed manner, and perform real-time rolling modeling on ICS traffic data collected in real time in the i-th short cycle, where the real-time traffic data is equivalent to a validation set; compare the validation set with upper and lower bounds of a confidence interval-based traffic threshold generated in the forecasting process, where upper and lower thresholds for the i-th short cycle are:

$$U_{T_{fore}}^{(i)} = \hat{X}_{T_{fore}}^{(i)} + z_{(1-\alpha_{P.I})} \sqrt{\frac{1}{T_{fore}} \cdot \sum_{k=1}^{T_{fore}} \left[\hat{X}_k^{(i)} - \hat{\mu}^{(i)}\right]^2}$$

$$L_{T_{fore}}^{(i)} = \hat{X}_{T_{fore}}^{(i)} - z_{(1-\alpha_{P.I})} \sqrt{\frac{1}{T_{fore}} \cdot \sum_{k=1}^{T_{fore}} \left[\hat{X}_k^{(i)} - \hat{\mu}^{(i)}\right]^2}$$

$z_{(1-\alpha_{P.I})}$ is z distribution at a significance level of $1-\alpha_{P.I}$, $U_{T_{fore}}^{(i)}$ is an upper bound of a dynamic threshold interval of the i-th short cycle, $L_{T_{fore}}^{(i)}$ is a lower bound of the dynamic threshold interval, $U_{T_{fore}}^{(i)}$ and $L_{T_{fore}}^{(i)}$ each are a time series with a length of $T_{fore}$, and $\alpha_{P.I}$ is a confidence level.

Normal ICS communication traffic of the i-th iteration is defined as follows:

$$\begin{cases} l_j^{(i)} \leq x_j^{(i)} \leq u_j^{(i)} & (j = 1, 2, 3, \ldots, T_{fore}) \\ U_{T_{fore}}^{(i)} = \{u_1^{(i)}, u_2^{(i)}, u_3^{(i)}, \ldots, u_{T_{fore}}^{(i)}\} \\ L_{T_{fore}}^{(i)} = \{l_1^{(i)}, l_2^{(i)}, l_3^{(i)}, \ldots, l_{T_{fore}}^{(i)}\} \end{cases}$$

$X_{T_{fore}}^{(i)}$ is ICS communication traffic collected in real time in the i-th short cycle, and $T_{fore}$ is a sample size.

Based on a real-time correlation between an ICS forecast sequence $X_{T_{fore}}^{(i)}$ and a training sequence $X_{T_{trai}}^{(i)}$ in the i-th short cycle, the forecast sequence $X_{T_{fore}}^{(i)}$ of the i-th short cycle may be estimated as follows:

$$X_{T_{fore}}^{(i)} \approx X_{T_{trai}}^{(i+1)} - (X_{T_{trai}}^{(i+1)} \cap X_{T_{trai}}^{(i)})$$

A function $\cap$ is used to get an intersection of two time series sets.

3.9) After traffic determination ends, proceed with training iteration of a next short cycle, output a new optimal model and parameters adapted to the model, and determine newly input real-time traffic data.

3.10) Repeat the whole process until a specified number of iterations is reached.

Assuming that a sequence of actual occurrence time of ICS anomalies is $T_n^{anom} = \{t_1^{anom}, t_2^{anom}, \ldots, t_n^{anom}, n \in \mathbb{N}\}$, where n is the total number of anomalies, a sequence of sample sizes corresponding to short-cycle sequence numbers upon anomalies, $S_n^{anom} = \{s_1^{anom}, s_2^{anom}, \ldots, s_n^{anom}, n \in \mathbb{N}\}$, is:

$$S_n^{anom} = (T_n^{anom} - t_{debug}) / \gamma_{samp}$$

$t_{debug}$ is real-time debugging time before a program runs, $\gamma_{samp}$ is a sampling frequency of ICS traffic, and a time series algorithm directly performs calculation on corresponding sequence elements.

The n-th ICS anomaly occurs in the $i_n^{anom}$-th short-cycle iteration. Therefore, the number of short-cycle iterations upon an ICS anomaly event, $i_n^{anom}$ (element of $I_n^{anom}$), can be calculated according to the following equations:

$$\begin{cases} K_n = (S_n^{anom} - T_{trai}) \bmod(T_{fore}) \\ I_n^{anom} = (S_n^{anom} - T_{trai} - K_n) / (T_{fore}) + 1 \\ I_n^{anom} = (i_1^{anom}, i_2^{anom}, \ldots, i_3^{anom}, n \in \mathbb{N}) \end{cases}$$

$K_n$ is an intermediate variable.

A variance $\hat{\sigma}_k$ of the dynamic ICS traffic threshold interval generated by the SARIMA online detection algorithm can be obtained according to the following formula:

$$\hat{\sigma}_k = \sqrt{\sum_{i=1}^{T_{fore}} \left(U_i^{(i_k^{anom})} - L_i^{(i_k^{anom})}\right)^2 / T_{fore}}$$

k=1, 2, ..., n n∈ℕ, and $\hat{\sigma}_k$ can measure an overall deviation of a threshold of the $i_k^{anom}$-th short-cycle iteration, which is helpful for analyzing an abnormal degree of the ICS network.

Figure 6:
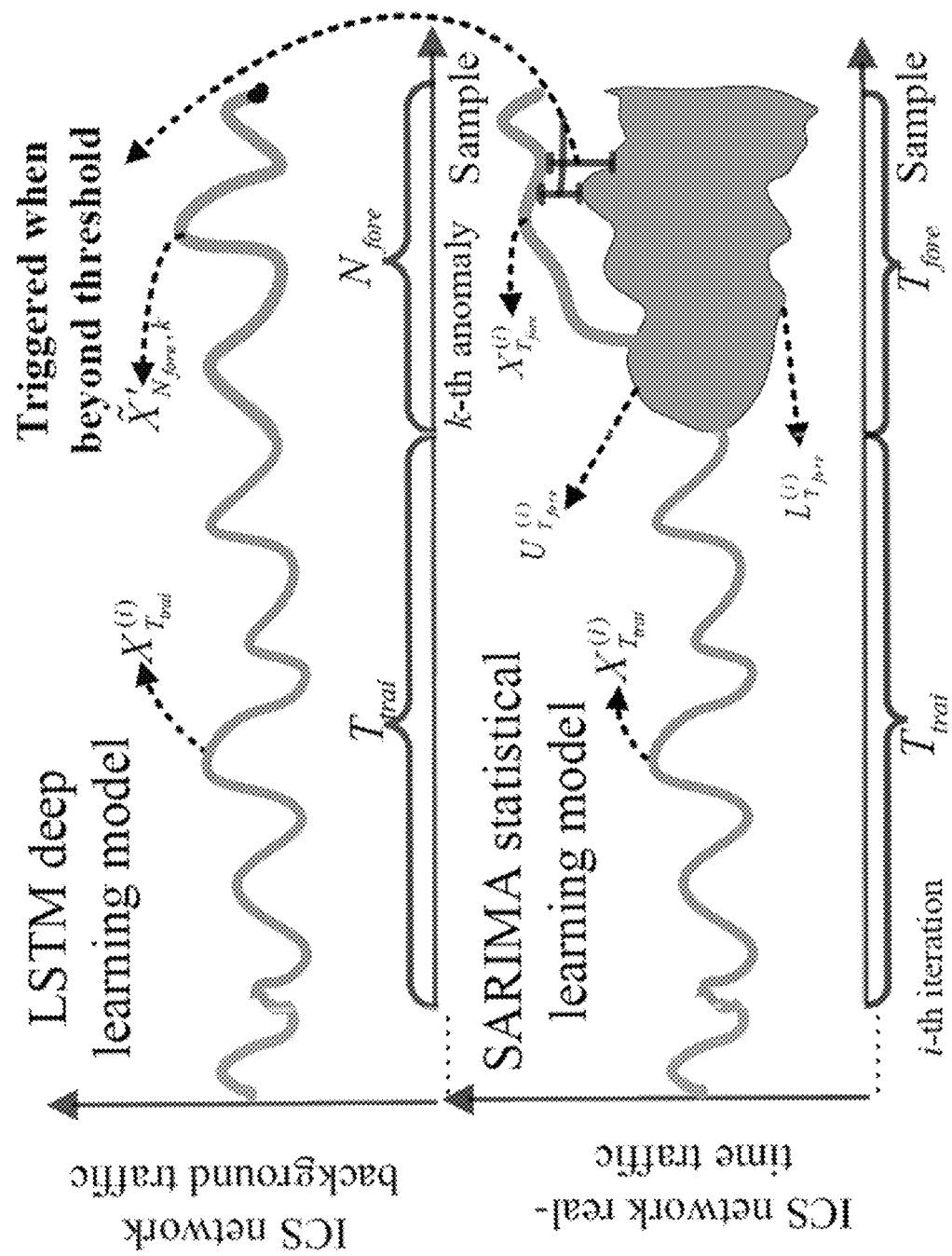
FIG. 6 is a schematic diagram of cross calculation of a SARIMA statistical learning algorithm and an LSTM machine learning algorithm according to an embodiment of the present disclosure.

4) Referring to the algorithm shown in FIG. 6, use the short-cycle SARIMA model training set with the anomaly as input of the stored LSTM deep learning model, and output a corresponding forecast sequence online.

An LSTM deep learning model-based algorithm for online forecasting and analysis of ICS normal communication traffic is as follows:

$$\tilde{X}'_{N_{fore},n} = \text{Model}_{LSTM}(X_{T_{trai}}^{(I_n^{anom})}, N_{fore})$$

$\text{Model}_{LSTM}( )$ is the LSTM deep learning model obtained from offline training in step 2, $\tilde{X}'_{N_{fore},n}$ is the ICS normal communication traffic sequence forecast by the online LSTM model, $X_{T_{trai}}^{(I_n^{anom})}$ is the input of the online model, and $N_{fore}$ is a forecast traffic sequence length. Based on a sequence $I_n^{anom}$ ($I_n^{anom}=\{i_1^{anom}, i_2^{anom}, \ldots, i_n^{anom}, n \in \mathbb{N}\}$) of short cycles of the online SARIMA model upon anomaly events, an online SARIMA model training set $X_{T_{trai}}^{(i_n^{anom})}$ of a current short cycle is obtained ($X_{T_{trai}}^{(I_k^{anom})}$, k=1, 2, . . . , n n∈ ℕ is a SARIMA training set for each short training cycle), where n is the total number of anomaly events. This training set retains a traffic pattern before occurrence of an anomaly, and also defines the input of the online LSTM deep learning model, based on which an LSTM online forecast sequence of $\tilde{X}'_{N_{fore},n}$ ICS network traffic anomaly events output by the online model is obtained, where $N_{fore}$ is a length of a sequence corresponding to an anomaly event.

The offline LSTM deep learning model can be used as priori knowledge to validate normal background traffic of the ICS communication network. Based on a time correspondence between the $i_k^{anom}$ (k=1, 2, . . . , n n∈ ℕ )-th short cycle in which an anomaly event occurs and the online SARIMA model training set $X_{T_{trai}}^{(I_n^{anom})}$, the ICS communication network anomaly events can be classified by using the online LSTM deep learning model as posteriori knowledge. The online LSTM deep learning model also features low algorithm complexity.

A variance $\tilde{\sigma}_k$ of the online forecast sequence of the LSTM deep learning model is:

$$\hat{\sigma}_k = \sqrt{\sum_{j=1}^{N_{fore}} \left(\tilde{x}'_{j,k} - \frac{1}{N_{fore}} \sum_{i=1}^{N_{fore}} \tilde{x}'_{i,k}\right)^2 / N_{fore}}$$

k=1, 2, . . . , n n∈ ℕ, and $\tilde{\sigma}_k$ can reflect fluctuation and deviation of online forecasting by the LSTM model at the k-th anomaly event, and can be used as a key parameter for analyzing the background traffic of the ICS communication network.

5) Design an abnormal-traffic classification algorithm to classify ICS communication network anomalies by performing numerical statistics and calculation on the obtained traffic.
5.1) A real-time time label error algorithm is defined as follows:

$$\frac{|t_i^{anom} - t_i^{whit}|}{\gamma_{samp} \cdot T_{trai}} \leq \varepsilon$$

$(i = 1, 2, 3, \ldots, n \; n \in \mathbb{N})$

A predefined error ε is used as a critical value to limit a deviation between a timestamp of an anomaly event and a timestamp of whitelisting, $t_i^{anom}$ is an element of an anomaly event time series $T_n^{anom}$, and $t_i^{whit}$ is an element of a time series $T_n^{whit}$ of whitelisted ICS valid action time and planned maintenance event time. If the critical value of the deviation between the timestamp of the anomaly event and the timestamp of whitelisting is within the deviation, the abnormal ICS communication traffic is generated by an ICS valid action and planned maintenance event.

If $|t_k^{anom}-t_k^{whit}|/(\gamma_{samp} \cdot T_{trai}) > \varepsilon$, the abnormal ICS communication traffic is generated by a malicious action.

5.2) Calculate average values of upper and lower bounds of the threshold and an average value of forecast background traffic in the $i_k^{anom}$-th short cycle based on the upper and lower bounds of the online SARIMA model threshold in a short cycle with an anomaly event, and the ICS communication network background traffic forecast by the LSTM model. Normal ICS communication network background traffic satisfies the following equation:

$$\frac{1}{T_{fore}} \sum_{i=1}^{T_{fore}} l_i^{(i_k^{anom})} \leq \frac{1}{N_{fore}} \sum_{i=1}^{N_{fore}} \tilde{x}'_{i,k} \leq \frac{1}{T_{fore}} \sum_{i=1}^{T_{fore}} u_i^{(i_k^{anom})}$$

$$k = 1, 2, \ldots, n \; n \in \mathbb{N}$$

$\tilde{x}'_{i,k}$ is an element of $\tilde{X}'_{N_{fore},k}$.

From the variance $\tilde{\sigma}_k$ of the online forecast sequence of the LSTM deep learning model and the variance $\hat{\sigma}_k$ of the dynamic traffic threshold interval generated by the SARIMA online detection algorithm, it can be learned that a variance $\tilde{\sigma}_k$ of the normal ICS communication network background traffic needs to be less than the variance $\hat{\sigma}_k$ of the dynamic traffic threshold interval generated by the SARIMA algorithm:

$$\tilde{\sigma}_k \leq \hat{\sigma}_k$$

Therefore, when the following inequation holds, it can be inferred that the ICS communication network is faulty or abnormal.

$$\begin{cases} \frac{1}{N_{fore}} \sum_{i=1}^{N_{fore}} \tilde{x}'_{i,k} > \frac{1}{T_{fore}} \sum_{i=1}^{T_{fore}} u_i^{(i_k^{anom})} & k=1,2,\ldots,n \; n \in \mathbb{N} \\ \tilde{\sigma}_k > \hat{\sigma}_k \\ 0 < \frac{1}{N_{fore}} \sum_{i=1}^{N_{fore}} \tilde{x}'_{i,k} < \frac{1}{T_{fore}} \sum_{i=1}^{T_{fore}} l_i^{(i_k^{anom})} & k=1,2,\ldots,n \; n \in \mathbb{N} \end{cases}$$

In this case, the abnormal ICS communication traffic is caused by the abnormal ICS network or communication data transmission failure.

5.3) Different network attacks have different effects on ICS communication network traffic, especially for some types of packets. A Berkeley packet filter (BPF) algorithm is used to distinguish data packet types in real-time collected ICS communication network traffic. The BPF algorithm is defined as follows:

$$X_t \xrightarrow{BPF} X_t^{TCP} + X_t^{UDP} + X_t^{ARP} + X_t^{ICMP} + \ldots$$

$\xrightarrow{BPF}$ is the BPF algorithm, $X_t^{TCP}$ is a TCP traffic sequence split from an original traffic sequence $X_t$, and similarly, $X_t^{UDP}$ is a UDP traffic sequence split from the original traffic sequence $X_t$.

$[X_t]_{type}$ represents total traffic of a specified type of packet (TCP, UDP, ARP, or the like) in the ICS communication network traffic sequence $X_t$. Calculate a distribution deviation $\tau_{type}^{(i_k^{anom})}$ of different types of data packets under the ICS network data traffic:

$$\tau_{type}^{(i_k^{anom})} = \left( \frac{[X_{T_{trai}}^{(i_k^{anom})}]_{type} - [X_{T_{fore}}^{(i_k^{anom})}]_{type}}{\sum_{m=1}^{T_{trai}} X_m^{(i_k^{anom})}} \right)^2 / \left( \frac{T_{trai} - T_{fore}}{T_{trai}} \right)^2$$

where type=TCP, UDP, ARP . . . .

A baseline of the distribution deviation can be calculated by the BPF from a training sequence $X'_{N_{trai}}$ of large ICS normal communication traffic (offline training set of the LSTM deep learning model):

$$Dist_{type} = [X'_{N_{trai}}]_{type} / \sum_{i=1}^{N_{trai}} X'_i$$

(type = UDP, TCP, ARP, etc)

When $\tau_{type}^{(i_k^{anom})}$ satisfies the following formula, the ICS communication traffic anomaly event is caused by malicious intrusion into the ICS communication network.

$$\tau_{type}^{(i_k^{anom})} > \varepsilon_{type}^{pd} \cdot Dist_{type}^2$$

$\varepsilon_{type}^{pd}$ is an allowable distribution error of a specified type of packet.

In this case, $Att_{type}$=type (type=UDP,TCP,ARP, etc) indicates that the abnormal ICS communication traffic is caused by malicious intrusion into the ICS communication network. An attack type is type (UDP Flooding, TCP Flooding, ARP Spoofing, or the like).

The detected ICS communication network anomaly events can be classified into three types: malicious action on the ICS communication network, ICS network anomaly or communication data transmission failure, and malicious intrusion attack on the ICS communication network.

Based on the previous offline analysis of the communication network traffic actually collected from the ICS test network range in Zhejiang University, as well as the characteristics of the ICS communication network traffic, an actual test platform is built, and an industrial switch, a monitoring host, and a test host are deployed in the test environment, and online testing and analysis are performed on an ICS attack injection platform and a network security platform. As shown in FIG. 2, the test platform can be logically divided into an attack injection platform and an ICS network security platform. The ICS network security platform is equipped with three sets of PLCs (ECS700), one set of monitoring system (Core i7, 8086K) embedded with a probe algorithm mechanism, one set of engineer station (Core i5, 8600K) with industrial control software capable of uploading and issuing PLC commands and modifying and releasing configuration, and an industrial Ethernet switch. The attack injection platform (Core i5, i5-6267u, MacBook pro) is connected to the industrial Ethernet switch through an optical fiber to inject malicious network attacks into a target ICS control system. The engineer station communicates with the PLC over TCP/IP, and the PLC communicates with field devices over the Modbus protocol. The monitoring system equipped with the probe mechanism dynamically collects ICS communication network traffic from a mirror port or a general port of the industrial Ethernet switch, and a Python-compiled hybrid anomaly detection and classification method based on statistical learning and machine learning is embedded into the monitoring system to identify, detect, and classify malicious actions, network anomalies, and network attacks in time.

The distributed short-cycle SARIMA model is used to analyze the ICS communication network traffic, and generate a threshold interval in real time, with an ICS traffic sampling frequency of 1 ms.

Based on the collected ICS communication network background traffic data, appropriate LSTM training parameters are selected to train an LSTM deep learning-based ICS network background traffic model in offline mode. The following table lists LSTM training parameters.

TABLE 1

| Time_step | 20 | Batch_size | 1024 | Traffic aggregation scale | 1 s |
|---|---|---|---|---|---|
| LSTM_layers | 10 | Rnn_unit | 35 | Training time | 23518 s |
| Lr | 0.04 | Lr optimizer | Exponential | Training set size | 2.6 * 10⁶ |

Figure 7:
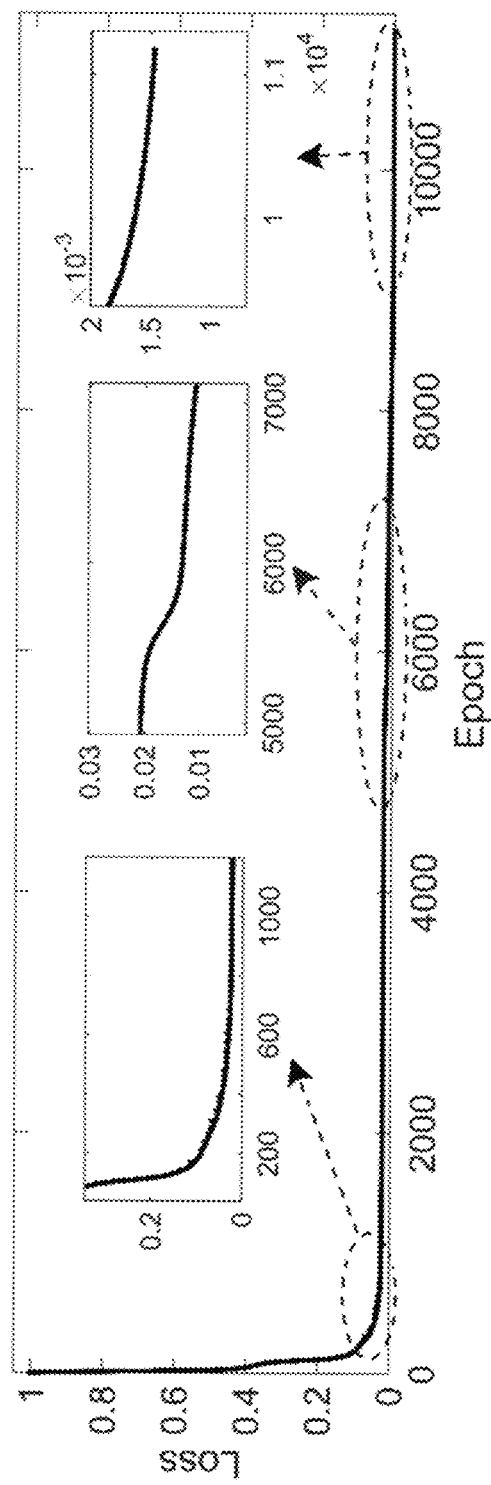
FIG. 7 is a diagram of a training loss function of an LSTM model according to an embodiment of the present disclosure.

As shown in FIG. 7, an obtained offline ICS communication network background traffic model can fit the time-based background traffic well, and a trained loss function decreases with the increase of an iteration step size, and finally reaches about 1.4%. In FIG. 7, data on the x-axis is the number of iterations for LSTM model training (Epoch), and data on the y-axis is a loss function for model training. Figures in small boxes show cases in which the loss function has dropped significantly. When the number of iterations (Epoch) is 60-600, 5000-7000, and 9500-11000, the loss function decreases faster. The training algorithm of the model is as follows:

$$Model_{LSTM} \leftarrow f_{LSTM}(X'_{200}, 20, Para\square)$$

Para$\square$ represents the LSTM training parameters in Table 1.

Test and validation are performed on the stored LSTM offline model. A new round of collection is performed to collect ICS communication network background traffic as new input of the model. Actual data is output for validation. Every 200 sequences collected are used as training sequences, and 20 sequences are used as forecast sequences (totally 220 sequences in one cycle), MAPE and RMSE values of the forecast sequences are calculated, and ICS communication network background traffic collected in a new round is used. The analysis is repeated for 10 cycles. The values of MAPE, RMSE, and Time are shown in Table 2.

TABLE 2

| | 1-220 | 221-440 | 441-660 | 661-880 | 881-1000 | 1001-1220 | 1221-1440 | 1441-1660 | 1441-1660 | 1441-1660 |
|---|---|---|---|---|---|---|---|---|---|---|
| MAPE | 0.092 | 0.112 | 0.059 | 0.151 | 0.058 | 0.059 | 0.077 | 0.122 | 0.107 | 0.12 |
| RMSE | 45.51 | 69.69 | 28.47 | 100.5 | 28.47 | 28.46 | 42.30 | 94.16 | 59.57 | 75.5 |
| Time | 8.10 s | 8.11 s | 7.34 s | 7.64 s | 7.34 s | 7.33 s | 7.61 s | 7.67 s | 8.62 s | 7.60 s |

In the table, 1-220 indicates that the first 1 to 200 data samples are a training set and the next 201 to 220 data samples are a test set. It can be seen that in each analyzed sequence set, the MAPE value is less than 0.15, and the RMSE value is less than 100. Samples 441 to 660, 881 to 1000, and 1001 to 1220 have similar MAPE and RMSE values, reflecting the periodicity and self-similarity of ICS network background traffic data.

A distributed SARIMA(p, d, q)×(P, D, Q)$_s$ model is built for the real-time collected ICS communication network traffic. The number of short-cycle training items is defined as $T_{trai}$=300 and $T_{fore}$=30, and econometric analysis is performed on the SARIMA(p, d, q)×(P, D, Q)$_s$ model in a single short cycle. Taking the first short-cycle iteration (that is, i=1) of the SARIMA(p, d, q)×(P, D, Q)$_s$ model as an example, the following shows how to calculate an ICS network traffic threshold interval for the first short cycle. Assuming that original sequences are not aggregated, modeling is performed based on ICS traffic data collected online in a single short cycle, to obtain a model SARIMA(2, 1, 3)×(2, 0, 0)$_{10}$. A fitting parameter of the model is $$MSE = SSE/n = \frac{1}{n}\sum_{i=1}^{n}(y_i - \hat{y}_i) = 4.12,$$

R-Square=0.89. Therefore, it can be obtained that SARIMA (2, 1, 3)×(2, 0, 0)$_{10}$ can well interpret ICS communication traffic in the short cycle $T_{trai}$=300, and its threshold interval represents the situation of ICS communication traffic in $T_{fore}$=30. An upper bound time series of the threshold interval is:

$$U^{(1)}_{T_{fore}} = \hat{X}^{(1)}_{T_{fore}} + z_{(1-\alpha_{P,I})}\sqrt{\frac{1}{T_{fore}}\cdot\sum_{k=1}^{T_{fore}}[\hat{X}^{(1)}_k - \hat{\mu}^{(1)}]^2} = $$

$$\{381.3, 0, 409.1, 0, \ldots, 0, 502.3\}$$

A timestamp corresponding to the time series is: {13:52:19, 13:52:20, 13:52:21, . . . , 13:52:50, 13:52:51}. This timestamp indicates that the ICS communication traffic is consistent with that in an actual site, and physical information spatially corresponds to each other.

Therefore, after the SARIMA(2,1,3)×(2,0,0)$_{10}$ model is built for the ICS communication traffic in the short cycle $T_{trai}$=300, ICS communication traffic in the validation cycle $T_{fore}$=30 is normal ICS communication traffic without any anomaly. A sequence $t_n^{anom}$ of ICS anomaly occurrence time is an empty set, and a sequence $I_n^{anom}$ of short-cycle iteration counts upon anomaly events is an empty set. In this case, the variance $\hat{\sigma}_k$ is 0. An abnormal degree sequence is $\lambda_{T_{fore}}^{(1)}=\{0, 0, 0, 0, 0, \ldots 0, 0\}$.

After modeling characteristics of the SARIMA model are validated, real-time anomaly detection is performed on a next ICS traffic sequence with a different sampling frequency. The specified ICS traffic sampling frequency $\gamma_{samp}$ is 60(s). The aggregation scale is changed to 1 s. The start time of running the model is 04:14:26, the online traffic monitoring model is kept running, and model parameters in the current short cycle are acquired. With respect to the current time, SARIMA(5, 0, 3)×(0, 0, 1)$_1$ is the optimal model.

Table 3 shows econometrics parameters of the SARIMA (5, 0, 3)×(0, 0, 1)$_1$ model.

TABLE 3

| Model | SARIMA(5, 0, 3) × (0, 0, 1)$_1$ | | |
|---|---|---|---|
| Start date | 2019 Sep. 06, Monday | Number of training sets | 300 |
| Start time | 04:14:26 | Number of test sets | 20 |
| Training time | 0.23 s | Forecast time | 0.03 s |
| Parameter H | 0.598 | Aggregation scale | 1 |
| Ljung-Box(Q) | 77.76 | Jarque-Bera (JB): | 3730.21 |
| Log likelihood | −1671.49 | AIC | 3362.97 |
| BIC | 3400.012 | HQIC | 3377.80 |

Table 4 shows fitting parameters of the SARIMA(5,0,3)× (0,0,1)$_1$ model.

TABLE 4

| | Fitting coefficient | Standard deviation | z | P > \|z\| | $\alpha_{P,I} \in [0.025, 0.975]$ | |
|---|---|---|---|---|---|---|
| Captured value | 77.4433 | 35.953 | 2.154 | 0.031 | 6.679 | 147.911 |
| ar. L1 | −0.0886 | 0.047 | −1.903 | 0.057 | −0.180 | 0.003 |
| ar. L2 | −0.1065 | 0.053 | −2.026 | 0.043 | −0.209 | −0.003 |
| ar. L3 | −0.1283 | 0.047 | −2.712 | 0.007 | −0.221 | −0.036 |
| ar. L4 | −0.0516 | 0.045 | −1.141 | 0.254 | −0.140 | 0.037 |
| ar. L5 | 0.8362 | 0.043 | 19.289 | 0.000 | 0.751 | 0.921 |
| ma. L1 | 0.1187 | 0.062 | 1.906 | 0.057 | −0.003 | 0.241 |
| ma. L2 | 0.1123 | 0.046 | 2.423 | 0.015 | 0.021 | 0.203 |
| ma. L3 | 0.2232 | 0.064 | 3.485 | 0.000 | 0.098 | 0.349 |
| ar. S. L6 | 0.0996 | 0.039 | 2.542 | 0.011 | 0.023 | 0.176 |
| Sigma$^2$ | 4087.1591 | 268.775 | 15.207 | 0.000 | 3560.369 | 4613.949 |

The following tests how an algorithm classifies ICS network anomaly events. First, the test host is connected to the industrial switch and initiates TCP-flooding attacks on the monitoring host. Abnormal traffic increases abruptly per unit time, and traffic returns to normal after the attacks. The TCP-flooding attack was injected at 14:36:50, and the traffic increased abruptly. Then injection of abnormal traffic stopped at 14:38:00.

In this case, an upper bound time series of the threshold interval is:

$$U_{T_{fore}}^{(i)} = \hat{X}_{T_{fore}}^{(i)} + z_{(1-\alpha_{P,I})}\sqrt{\frac{1}{T_{fore}} \cdot \sum_{k=1}^{T_{fore}} [\hat{X}_k^{(i)} - \hat{\mu}^{(i)}]^2} =$$

$$\{1650.3, 1750.2, \ldots, 2012.3, 2021.8\}.$$

A lower bound time series of the threshold interval is:

$$L_{T_{fore}}^{(i)} = \hat{X}_{T_{fore}}^{(i)} + z_{(1-\alpha_{P,I})}\sqrt{\frac{1}{T_{fore}} \cdot \sum_{k=1}^{T_{fore}} [\hat{X}_k^{(i)} - \hat{\mu}^{(i)}]^2} =$$

$$\{350.3, 442.2, \ldots, 540.3, 607.8\}$$

A timestamp corresponding to the time series is:

{14:36:20, 14:37:20, 14:38:20, . . . , 14:54:20, 14:55:20}

Through the above model, a normal flow threshold at an actual moment can be approximately obtained in a short time interval. For example, at 14:36:20, when a confidence interval is 95%, a normal traffic interval is [350.3, 1650.3]; and when the confidence interval is 90%, the normal traffic interval is [398.3, 1621.6]. Based on this, an ICS communication traffic threshold model at a specific moment under normal circumstances can be obtained.

Because $l_1^{(i)} \leq x_1^{(i)} \leq u_1^{(i)}$, $l_2^{(i)} \leq x_2^{(i)} \leq u_2^{(i)}$, and $l_3^{(i)} \leq x_3^{(i)} \leq u_3^{(i)}$ at 14:36:20, 14:37:20, 14:38:20, the ICS communication network traffic exceeds the normal traffic threshold interval generated by the SARIMA model, so the system determines that an ICS network anomaly event occurs.

The actual occurrence time of the anomaly events is:

$T_3^{anom} = \{14:36:20, 14:37:20, 14:38:20\}$ where n is 3, which means three anomalies.

$t_{debug}=4$, $\gamma_{anom}=60$, and $S_3^{anom}=\{s_1^{anom}, s_1^{anom}, s_1^{anom}\}$ can be obtained:

$S_3^{anom}=\{(37314-4)/60, (37374-4)/60, (37434-4)/60\}$

From the following formula:

$$\begin{cases} K_3 = (S_3^{anom} - 300) \bmod(20) \\ I_3^{anom} = (S_3^{anom} - 300 - K_n)/(20) + 1 \\ I_3^{anom} = (i_1^{anom}, i_2^{anom}, i_3^{anom}) \end{cases}$$

and $i_1^{anom} i_2^{anom} = i_3^{anom}$, $I_3^{anom} = \{17,17,17\}$ can be obtained. Therefore, the number of short-cycle iterations upon ICS anomaly events is 17.

Through calculation and analysis, $X_{T_{fore}}^{(17)} \approx X_{T_{trai}}^{(16+1)}$ — $(X_{T_{trai}}^{(16+1)}) \cap X_{T_{trai}}^{(1)}$), indicating that training sequences of the 16-th short cycle are approximately continuous with those in the 17-th short cycle in time. Therefore, the real-time performance of the method for online detection of ICS communication traffic is well guaranteed.

A variance $\hat{\sigma}_k$ of the dynamic ICS traffic threshold interval generated by the SARIMA online detection algorithm can be obtained according to the following formula:

$$\hat{\sigma}_1 = \hat{\sigma}_2 = \hat{\sigma}_3 = \sqrt{\sum_{i=1}^{20}\left(U_i^{(i_1^{anom})} - L_i^{(i_1^{anom})}\right)^2/20} = 1475.079$$

k=1,2,3 (where $\hat{\sigma}_l$) can measure an overall deviation of a threshold of the $i_k^{anom}$-th short-cycle iteration, which is helpful for analyzing an abnormal degree of the ICS network. According to the above variance analysis, a normal fluctuation range of the normal traffic is 0~1475.079.

The possibility of ICS anomaly events coming from planned ICS maintenance or valid actions is evaluated.

According to the action audit time table $T_n^{whit}$, $\{t_1^{anom}, t_2^{anom}, t_3^{anom}\} \notin T_n^{whit}$. Based on a delay coefficient defined for ICS communication, $\varepsilon=0.001$, thus:

$|t_k^{anom} - t_k^{whit}|/(60 \cdot 200) > 0.001$ (k=1, 2, 3)

Therefore, the three ICS anomaly events come from malicious actions instead of planned ICS maintenance or valid actions.

The possibility of ICS anomaly events coming from significant changes in the background traffic of the ICS communication network caused by its own anomaly or failure is evaluated.

Because the three anomalies all occurred in the 17-th iteration of the same short-cycle SARIMA model, $X_{200}^{(i_1^{anom})} = X_{200}^{(i_2^{anom})} = X_{200}^{(i_3^{anom})}$. The short-cycle SARIMA training sets corresponding to the three anomalies are the same, and used as the input of the trained LSTM model, to predict 20 ICS background traffic values in chronological order, as shown in the following equation:

$\tilde{X}'_{20,3} = \text{Model}_{LSTM}(X_{200}^{(i_3^{anom})}, 20)$

The LSTM forecasting variance $\tilde{\sigma}_k$ is calculated, and a mean value of the sequence forecast by the LSTM, and a mean value of the upper and lower threshold interval sequence forecast by the SARIMA online forecasting algorithm are calculated:

$$\tilde{\sigma}_1 = \tilde{\sigma}_2 = \tilde{\sigma}_3 = \sqrt{\sum_{j=1}^{20}\left(\tilde{x}'_{j,1} - \frac{1}{20}\sum_{i=1}^{20}\tilde{x}'_{j,1}\right)^2/20} = 875.5$$

$$\frac{1}{20}\sum_{i=1}^{20}\tilde{x}'_{j,1} = \frac{1}{20}\sum_{i=1}^{20}\tilde{x}'_{j,2} = \frac{1}{20}\sum_{i=1}^{20}\tilde{x}'_{j,3} = 1222.41$$

$$\frac{1}{20}\sum_{k=1}^{20}U_k^{(17)} = 1857.15$$

$$\frac{1}{20}\sum_{k=1}^{20}L_k^{(17)} = 482.05$$

Thus $$\begin{cases} \tilde{\sigma}_k < \hat{\sigma}_k \quad k=1,2,3 \\ \frac{1}{20}\sum_{k=1}^{20}L_k^{(17)} < \frac{1}{20}\sum_{i=1}^{20}\tilde{x}'_{i,1} < \frac{1}{20}\sum_{k=1}^{20}U_k^{(17)} \end{cases}$$

Therefore, the anomaly events are not caused by significant changes in the background traffic of the ICS communication network due to abnormality or failure of the network itself; the background traffic of the ICS communication network maintains the original pattern, and the underlying protocol and heartbeat messages are not affected.

The possibility of ICS anomalies coming from cyber attacks is evaluated.

A deviation $\tau_{type}^{(17)}$ after BPF is calculated. The most typical message type, that is, type=UDP, TCP, ARP, is selected for analysis and calculation.

$$\tau_{TCP}^{(17)} = \left(\frac{[X_{200}^{(17)}]_{TCP} - [X_{20}^{(17)}]_{TCP}}{\sum_{m=1}^{200} X_m^{(17)}}\right)^2 \bigg/ \left(\frac{200-20}{200}\right)^2 = 0.019044$$

$$\tau_{ARP}^{(17)} = \left(\frac{[X_{200}^{(17)}]_{ARP} - [X_{20}^{(17)}]_{ARP}}{\sum_{m=1}^{200} X_m^{(17)}}\right)^2 \bigg/ \left(\frac{200-20}{200}\right)^2 = 4.7 \times 10^{-7}$$

$$\tau_{UDP}^{(17)} = \left(\frac{[X_{200}^{(17)}]_{UDP} - [X_{20}^{(17)}]_{UDP}}{\sum_{m=1}^{200} X_m^{(17)}}\right)^2 \bigg/ \left(\frac{200-20}{200}\right)^2 = 0.27667$$

A packet distribution benchmark $Dist_{type}$ under the large-volume offline LSTM training set is calculated, where type=UDP, TCP, ARP.

$$Dist_{TCP} = [X'_{2.6 \times 10^6}]_{TCP} \bigg/ \sum_{i=1}^{2.6 \times 10^6} X'_i = 0.0822$$

$$Dist_{ARP} = [X'_{2.6 \times 10^6}]_{rP} \bigg/ \sum_{i=1}^{2.6 \times 10^6} X'_i = 0.00068$$

$$Dist_{UDP} = [X'_{2.6 \times 10^6}]_{UDP} \bigg/ \sum_{i=1}^{2.6 \times 10^6} X'_i = 0.6551$$

According to actual experience, the communication network of the ICS test bench has less redundant data, so $\varepsilon_{TCP}^{pd} = \varepsilon_{ARP}^{pd} = \varepsilon_{UDP}^{pd} = 1$ is set. Thus:

$$\tau_{TCP}^{(17)} >> \varepsilon_{TCP}^{pd} \cdot Dist_{TCP}^2$$

$$\tau_{ARP}^{(17)} < \varepsilon_{ARP}^{pd} \cdot Dist_{ARP}^2$$

$$\tau_{UDP}^{(17)} < \varepsilon_{UDP}^{pd} \cdot Dist_{UDP}^2$$

The most likely type of anomaly is an attack against TCP packets, that is, a TCP-Flooding attack. Therefore, $Att_{type}$=TCP. Therefore, the ICS anomaly event comes from a TCP-Flooding attack.

To stun up, in the period of 14:36:20 to 14:39:20, there were anomaly events in the ICS communication network, and the anomaly events were caused by malicious or unauthorized operations. Calculation and analysis showed that an attacker initiated malicious intrusion through TCP-Flooding attacks.

What is claimed is:

1. A method for anomaly classification of an industrial control system (ICS) communication network, comprising the following steps:
   1) collecting, by a monitoring host of an ICS communication network, traffic data in real time from an industrial switch in the ICS communication network, and storing, by an industrial server, the real-time collected communication traffic data;
   2) performing online detection by using multiple short-cycle seasonal autoregressive integrated moving average (SARIMA) models, comprising:

running, for the traffic data collected in real time, multiple short-cycle SARIMA(p, d, q)×(P, D, Q)$_s$ statistical learning models in a distributed manner to generate an online traffic threshold interval for each short-cycle SARIMA models of the multiple SARIMA models in real time, and obtaining an abnormal traffic data set of ICS communication network corresponding to traffic data exceeding the online traffic threshold interval, wherein the traffic data exceeding the online traffic threshold interval is abnormal traffic data, and wherein the abnormal traffic data set comprising a training set for a short-cycle SARIMA model with the abnormal traffic data, upper and lower bounds of the online traffic threshold interval obtained from the training set, an online monitoring data set for comparing with the online traffic threshold interval, and time series corresponding to abnormal traffic data;
   3) identifying background traffic data of the ICS communication network by using an trained long short term memory (LSTM) deep leaning model in an online way, comprising:
   using the training set for each of the short-cycle SARIMA model with the abnormal traffic data as input of the trained LSTM deep learning model, and outputting a corresponding forecasted traffic sequence as the background traffic data; and
   obtaining a variance $\tilde{\sigma}_k$ of the forecasted traffic sequence and a variance $\hat{\sigma}_k$ of the online traffic threshold interval; and
   4) classifying anomalies of the ICS communication network, comprising:
   determining whether an anomaly of the ICS communication network is generated by an ICS valid action and planned maintenance event or by a malicious action, based on the time series corresponding to the abnormal traffic data;
   determining whether the anomaly of the ICS communication network is generated by an abnormal ICS network or communication data transmission failure, based on the upper and lower bounds of the online traffic threshold interval, the forecasted traffic sequence, the variance $\tilde{\sigma}_k$ of the forecasted traffic sequence and the variance $\hat{\sigma}_k$ of the online traffic threshold interval; and
   determining whether the anomaly of the ICS communication network is caused by a malicious intrusion attack on the ICS communication network by using a Berkeley packet filter (BPF) algorithm to distinguish data packet types of the traffic data collected in real time from the ICS communication network based on a distribution deviation for each data packet type.

2. The method for anomaly classification of an ICS communication network according to claim 1, wherein in step 3), a LSTM deep leaning model is designed and trained based on normal traffic training data of the ICS communication network, to obtain the trained LSTM deep leaning model and store it on the industrial server, which comprises:
   2.1) obtaining a network structure of the LSTM deep learning model based on memory cells, an input gate, an output gate, and a forget gate, wherein a forward calculation method for the network structure of the LSTM deep learning model is expressed as follows:

$$g_t^{(l)} = \psi(W_{gx}^{(l)} h_t^{(l-1)} + W_{gh}^{(l)} h_{t-1}^{(l)} + b_g^{(l)})$$

$$i_t^{(l)} = \delta(W_{ix}^{(l)} h_t^{(l-1)} + W_{ih}^{(l)} h_{t-1}^{(l)} + b_i^{(l)})$$

$$f_t^{(l)} = \delta(W_{fx}^{(l)} h_t^{(l-1)} + W_{fh}^{(l)} h_{t-1}^{(l)} + b_f^{(l)})$$

$$o_t^{(l)} = \delta(W_{ox}^{(l)} h_t^{(l-1)} + W_{oh}^{(l)} h_{t-1}^{(l)} + b_o^{(l)})$$

$$s_t^{(l)} = g_t^{(l)} \odot i_t^{(l)} + s_{t-1}^{(l)} \odot f_t^{(l)}$$

$$h_t^{(l)} = \psi(s_t^{(l)}) \odot o_t^{(l)}$$

$$s_t^{(l)} = g_t^{(l)} \odot i_t^{(l)} s_{t-1}^{(l)} \odot f_t^{(l)}$$

$$h_t^{(l)} = \psi(s_t^{(l)*l}) \odot o_t^{(l)}$$

wherein W is a weight matrix, and b is a weight vector, used to establish connections at an input layer, a memory layer, and an output layer. $s_t^{(l)}$ represents a state of a memory cell in the t-th step of the l-th layer, and $h_t^{(l)}$ is an output state of the memory cell in the t-th step at the l-th layer; δ is an activation function; ψ is a tanh function; ⊙ is the Hadamard product between sets; i, o, and f represent the input gate, the output gate, and the forget gate, respectively; and g represents an input node of the tanh function;

2.2) constructing the LSTM deep learning model based on normal traffic training data of the ICS communication network:

$$\text{Model}_{LSTM} \leftarrow f_{LSTM}(X'_{N_{trai}}, N_{fore}, \text{Para}\square)$$

wherein $f_{LSTM}(\ )$ is an LSTM deep learning model function, which uses a normal traffic training sequence $X'_{N_{trai}}$ from the ICS normal communication for model adaptation and training, Para□ represents a structure parameter set of the LSTM deep learning model, $N_{fore}$ represents a forecast sequence length of the LSTM deep learning model, and $N_{trai}$ represents a predefined training sequence length; and through the short-cycle SARIMA model training, generating the trained LSTM model reflecting normal traffic of the ICS communication network.

3. The method for anomaly classification of an ICS communication network according to claim 2, wherein step 2) comprises:

2.1) based on a selected traffic aggregation scale and a short-cycle analysis scale, generating a SARIMA(p,d,q)×(P,D,Q)$_s$ time series by using a SARIMA(p,d,q)×(P,D,Q)$_s$ sequence definition method, comprising:

separately performing d-order difference calculation and D-order seasonal difference calculation on an auto regressive moving average ARMA(p,q) model, to obtain a SARIMA(p,d,q)×(P,D,Q)$_s$ model, and using AR(p) and MA(q) models to obtain the ARMA(p,q) model, wherein the ARMA(p,q) model comprises:

$$X_t = \phi_1 X_{t-1} + \phi_2 X_{t-2} + \ldots + \phi_p X_{t-p} + \varepsilon_t - \theta_1 \varepsilon_{t-1} - \ldots - \theta_q \varepsilon_{t-q}$$

in the foregoing formula, $X_t$ represents a short-cycle stationary time series after averaging, with a relatively short length; $\phi_p$ represents a coefficient of an auto regressive term AR; $\theta_q$ represents a coefficient of a moving average term MA; $\varepsilon_t$ represents a random error term; p represents an order number of AR; and q represents an order number of MA;

substituting a delay operator B into the ARIMA(p, d, q) model, to obtain an AR coefficient polynomial $\Phi(B) = 1 - \phi_1 B - \ldots - \phi_p(B)^p$ and an MA coefficient polynomial $\Theta(B) = 1 - \theta_1 B - \ldots - \theta_q(B)^q$, wherein $BX_t = X_{t-1}$;

introducing a difference operator $\Delta^d = (1-B)^d$, wherein the ARIMA(p,d,q) model comprises:

$$\Phi(B)\Delta^d X_t = \Theta(B)\varepsilon_t$$

performing seasonal difference calculation on the ARIMA model, to obtain the SARIMA model, wherein the SARIMA model comprises:

$$\Phi_p(B)\Phi_p(B^s)\Delta^d\Delta_s^D X_t = \Theta_q(B)\Theta_Q(B^s)\varepsilon_t$$

wherein $\varepsilon_t$ represents a white noise sequence, d represents an order number of a trend difference, D represents an order number of a seasonal difference compensated based on cycle s, $B^s$ represents an s-order delay operator, $\Delta_s^D$ represents a seasonal difference operator, $B^s X_t = X_{t-s}$, $\Delta_s^D = 1 - B^s$, $\Phi_P(B^s)$ is a Q-order polynomial of $B^s$, and $\Phi_P(B^s)$ is a P-order polynomial of $B^s$;

2.2) using Bayesian Information Criterion (BIC) to supervise, analyze, and determine p, d, q, P, D, and Q orders of the SARIMA(p, d, q)×(P, D, Q)$_s$ model;

2.3) using a least square method to estimate a p-order coefficient $\phi_k$(k=1,2, ..., p), a q-order coefficient $\theta_k$(k=1,2, ..., q), a seasonal P-order coefficient $\phi_k^s$(k=s,2·s, ..., P·s), and a seasonal Q-order coefficient $\theta_k^s$(k=s,2·s, ..., Q·s) of SARIMA(p, d, q)×(P, D, Q)$_s$;

2.4) using the SARIMA(p, d, q)×(P, D, Q)$_s$ model under the optimal BIC to perform fitting analysis on the original sequence, and performing residual testing; and if a residual is white noise, performing inverse filtering on a fitted sequence to obtain a fitted value or a forecast value of the original sequence; or if the residual is not white noise, using the BIC to determine orders of the ARMA(p, q) model;

2.5) obtaining a mathematical expression of the short-cycle SARIMA(p, d, q)×(P, D, Q)$_s$ model;

2.6) collecting real-time traffic data from the ICS industrial switch, and generating a time series based on a specified sampling frequency $\gamma_{samp}$ and an aggregation scale, with a short cycle as an iterative cycle;

2.7) performing training based on the collected real-time traffic data, performing SARIMA(p, d, q)×(P, D, Q)$_s$ model training and adaptation in a short cycle, and then outputting an optimal model and parameters adapted to the optimal model, wherein a model in the i-th short cycle comprises:

$$\hat{X}_{T_{fore}}^{(i)} = f_{SARIMA}(X_{T_{trai}}^{(i)}, T_{fore}, s, \text{'BIC'})$$

wherein $f_{SARIMA}(\ )$ is a functional expression of the SARIMA(p, d, q)×(P, D, Q)$_s$ model, $X_{T_{trai}}^{(i)}$ is a short-cycle training set for the i-th iteration, $T_{fore}$ is the number of forecast sequences in the short cycle, s is a periodic parameter, 'BIC' is a criterion for selecting optimal (p, d, q, P, D, Q) parameters based on econometrics, and $\hat{X}_{T_{fore}}^{(i)}$ is a time series forecast at the i-th iteration of the SARIMA model;

calculating a forecasting average $\hat{\mu}^{(i)}$ of the i-th iteration:

$$\hat{\mu}^{(i)} = \frac{1}{T_{fore}} \cdot \sum_{k=1}^{T_{fore}} \hat{X}_k^{(i)}$$

2.8) running the short-cycle SARIMA(p, d, q)×(P, D, Q)$_s$ model in a distributed manner, and performing real-time rolling modeling based on ICS traffic data collected in real time in the i-th short cycle; using real-time traffic data as a validation set, and comparing the validation set with upper and lower bounds of a confidence interval-based traffic threshold generated in the forecasting process, wherein upper and lower thresholds for the i-th short cycle comprise:

$$U_{T_{fore}}^{(i)} = \hat{X}_{T_{fore}}^{(i)} + z_{(1-\alpha_{P.I})}\sqrt{\frac{1}{T_{fore}} \cdot \sum_{k=1}^{T_{fore}}\left[\hat{X}_k^{(i)} - \hat{\mu}^{(i)}\right]^2}$$

$$L_{T_{fore}}^{(i)} = \hat{X}_{T_{fore}}^{(i)} - z_{(1-\alpha_{P.I})}\sqrt{\frac{1}{T_{fore}} \cdot \sum_{k=1}^{T_{fore}}\left[\hat{X}_k^{(i)} - \hat{\mu}^{(i)}\right]^2}$$

wherein $z_{(1-\alpha_{P.I})}$ is z distribution at a significance level of $1-\alpha_{P.I}$, $U_{T_{fore}}^{(i)}$ is an upper bound of an online traffic threshold interval of the i-th short cycle, $L_{T_{fore}}^{(i)}$ is a lower bound of the online traffic threshold interval, $U_{T_{fore}}^{(i)}$ and $L_{T_{fore}}^{(i)}$ each are a time series with a length of $T_{fore}$, and $\alpha_{P.I}$ is a confidence level;

normal traffic data of the ICS communication network during the i-th iteration comprises:

$$\begin{cases} l_j^{(i)} \leq x_j^{(i)} \leq u_j^{(i)} & (j=1,2,3,\ldots,T_{fore}) \\ U_{T_{fore}}^{(i)} = \left\{u_1^{(i)}, u_2^{(i)}, u_3^{(i)}, \ldots, u_{T_{fore}}^{(i)}\right\} \\ L_{T_{fore}}^{(i)} = \left\{l_1^{(i)}, l_2^{(i)}, l_3^{(i)}, \ldots, l_{T_{fore}}^{(i)}\right\} \end{cases}$$

wherein $X_{T_{fore}}^{(i)}$ is a traffic sequence for the ICS communication network collected in real time in the i-th short cycle, and $T_{fore}$ is a sample size;

based on a real-time correlation between an ICS forecast sequence $X_{T_{fore}}^{(i)}$ and a training sequence $X_{T_{trin}}^{(i)}$ in the i-th short cycle, estimating the forecast sequence $X_{T_{fore}}^{(i)}$ of the i-th short cycle:

$$\hat{X}_{T_{fore}}^{(i)} \approx X_{T_{trai}}^{(i+1)} - (X_{T_{trai}}^{(i+1)} \cap X_{T_{trai}}^{(i)})$$

wherein a function $\cap$ is used to get an intersection of two time series sets;

2.9) after traffic determination ends, proceeding with training iteration of a next short cycle, outputting a new optimal model and parameters adapted to the model, and determining newly input real-time traffic data; and 2.10) repeating the whole process until a specified number of iterations is reached.

4. The method for anomaly classification for an industrial control system (ICS) communication network based on statistical learning and deep learning according to claim 3, wherein step 3) comprises:

setting a sequence $T_n^{anom}=\{t_1^{anom}, t_2^{anom}, \ldots, t_n^{anom}, n \in \mathbb{N}\}$ of actual occurrence time of ICS anomalies, wherein n is the total number of anomalies, to obtain a sequence of sample sizes corresponding to short-cycle sequence numbers upon anomalies, $S_n^{anom}=\{s_1^{anom}, s_2^{anom}, \ldots, s_n^{anom}, n \in \mathbb{N}\}$, is:

$$S_n^{anom} = (T_n^{anom} - t_{debug})/\gamma_{samp}$$

wherein $t_{debug}$ is real-time debugging time before step 3), and $\gamma_{samp}$ is a sampling frequency of ICS traffic;

calculating the number $i_n^{anom}$ of short-cycle iterations (element of $I_n^{anom}$) upon ICS anomaly events:

$$\begin{cases} K_n = (S_n^{anom} - T_{trai}) \bmod (T_{fore}) \\ I_n^{anom} = (S_n^{anom} - T_{trai} - K_n)/(T_{fore}) + 1 \\ I_n^{anom} = \{i_1^{anom}, i_2^{anom}, \ldots, i_n^{anom}, n \in \mathbb{N}\} \end{cases}$$

wherein $K_n$ is an intermediate variable;

calculating a variance $\hat{\sigma}_k$ of the online traffic threshold interval generated in the online detection process in step 3):

$$\hat{\sigma}_k = \sqrt{\sum_{i=1}^{T_{fore}} \left(U_i^{(i_k^{anom})} - L_i^{(i_k^{anom})}\right)^2 / T_{fore}}$$

wherein $k=1,2,\ldots,n \in \mathbb{N}$, and $\hat{\sigma}_k$ measures an overall deviation of a threshold of the $i_k^{anom}$-th short-cycle iteration;

predicting and analyzing normal traffic data of the ICS communication network based on the trained LSTM deep learning model:

$$\tilde{X}'_{N_{fore},n} = \text{Model}_{LSTM}(X_{T_{trai}}^{(I_n^{anom})}, N_{fore})$$

wherein $\text{Model}_{LSTM}(\ )$ is the trained LSTM deep learning model obtained from offline training in step 2), $\tilde{X}'_{N_{fore},n}$ is a forecasted traffic sequence from the trained LSTM deep learning model, $X_{T_{trai}}^{(I_k^{anom})}$ is input of the trained LSTM deep learning model, and $N_{fore}$ is a forecast traffic sequence length;

obtaining an online SARIMA model training set $X_{T_{trai}}^{(I_n^{anom})}$ in a current short cycle through a sequence $(I_n^{anom}=\{i_1^{anom}, i_2^{anom}, \ldots, i_n^{anom}, n \in \mathbb{N}\})$ of short cycles of the online SARIMA model upon anomaly events, wherein the SARIMA training set for each short training cycle is $$X_{T_{trai}}^{(i_k^{anom})}, k=1,2,\ldots,n, n\in \mathbb{N},$$

and n is the total number of anomaly events;

obtaining an LSTM online forecast sequence $\tilde{X}'_{N_{fore},n}$ of n output ICS network traffic anomaly events based on the online SARIMA model training set $X_{T_{trai}}^{(I_n^{anom})}$ in the current short cycle, wherein a length of a sequence corresponding to an anomaly event is $N_{fore}$;

based on a time correspondence between the $i_k^{anom}$ ($k=1, 2, \ldots, n$ $n \in \mathbb{N}$)-th short cycle in which an anomaly event occurs and the online SARIMA model training set $X_{T_{trai}}^{(I_n^{anom})}$, classifying the ICS communication network anomaly events by using the trained LSTM deep learning model as posteriori knowledge; wherein the variance $\tilde{\sigma}_k$ of the forecasted traffic sequence of the trained LSTM deep learning model comprises:

$$\tilde{\sigma}_k = \sqrt{\sum_{j=1}^{N_{fore}} \left(\tilde{x}'_{j,k} - \frac{1}{N_{fore}}\sum_{i=1}^{N_{fore}} \tilde{x}'_{i,k}\right)^2 / N_{fore}}$$

wherein $k=1,2,\ldots,n$ $n \in \mathbb{N}$, and $\tilde{\sigma}_k$ reflects fluctuation and deviation of online forecasted traffic sequence by the trained LSTM model at the k-th anomaly event, and is used as a key parameter for analyzing the background traffic of the ICS communication network.

5. The method for anomaly classification of an ICS communication network according to claim 4, wherein step 4) comprises:

4.1) executing a real-time time label error algorithm:

$$\frac{\left|t_i^{anom} - t_i^{whit}\right|}{\gamma_{samp} \cdot T_{trai}} \leq \varepsilon$$

$(i=1,2,3,\ldots,n \ n \in \mathbb{N})$ wherein a predefined errors $\varepsilon$ is used as a critical value to limit a deviation between a timestamp of an anomaly event and a timestamp of whitelisting, $t_i^{anom}$ is an element of an anomaly event time series $T_n^{anom}$, and $t_i^{whit}$ is an element of a time series $T_n^{whit}$ of whitelisted ICS valid action time and planned maintenance event time; if the critical value of the deviation between the timestamp of the anomaly event and the timestamp of whitelisting is within the deviation, the abnormal ICS communication traffic is generated by the ICS valid action and planned maintenance event;

if $|t_k^{anom} - t_k^{whit}|/(\gamma_{samp} \cdot T_{trai}) > \varepsilon$, the abnormal ICS communication traffic is generated by the malicious action;

4.2) calculating average values of upper and lower bounds of the online traffic threshold interval and an average value of the background traffic sequence forecasted in the $i_k^{anom}$-th short cycle based on the upper and lower bounds of the online traffic threshold interval of the online SARIMA model in the short cycle with an anomaly event and the background traffic sequence of the ICS communication network forecasted by the trained LSTM deep learning model, wherein normal background traffic sequence of the ICS communication network comprises:

$$\frac{1}{T_{fore}} \sum_{i=1}^{T_{fore}} l_i^{(i_k^{anom})} \leq \frac{1}{N_{fore}} \sum_{i=1}^{N_{fore}} \tilde{x}'_{i,k} \leq \frac{1}{T_{fore}} \sum_{i=1}^{T_{fore}} u_i^{(i_k^{anom})}$$

$k = 1, 2, \ldots, n$ $n \in \mathbb{N}$ wherein $\tilde{x}'_{i,k}$ is an element of $\tilde{X}_{N_{fore}, k}$;

based on the variance $\tilde{\sigma}_k$ of the forecasted traffic sequence of the LSTM deep learning model and the variance $\hat{\sigma}_k$ of the online traffic threshold interval generated by the SARIMA online detection algorithm, obtaining that a variance $\tilde{\sigma}_k$ of the normal background traffic of the ICS communication network needs to be less than the variance $\hat{\sigma}_k$ of the online traffic threshold interval generated dynamically by the SARIMA algorithm:

$\tilde{\sigma}_k \leq \hat{\sigma}_k$ when the inequation $$\begin{cases} \frac{1}{N_{fore}} \sum_{i=1}^{N_{fore}} \tilde{x}'_{i,k} > \frac{1}{T_{fore}} \sum_{i=1}^{T_{fore}} u_i^{(i_k^{anom})} & k = 1, 2, \ldots, n \quad n \in \mathbb{N} \\ \tilde{\sigma}_k > \hat{\sigma}_k \\ 0 < \frac{1}{N_{fore}} \sum_{i=1}^{N_{fore}} \tilde{x}'_{i,k} < \frac{1}{T_{fore}} \sum_{i=1}^{T_{fore}} l_i^{(i_k^{anom})} & k = 1, 2, \ldots, n \quad n \in \mathbb{N} \end{cases}$$

holds, the ICS communication network is faulty or abnormal, and the abnormal ICS communication traffic is caused by the abnormal ICS network or communication data transmission failure;

4.3) using a Berkeley packet filter (BPF) algorithm to distinguish data packet types in real-time collected communication network traffic, wherein the BPF algorithm comprises:

$$X_t \xrightarrow{BPF} X_t^{TCP} + X_t^{UDP} + X_t^{ARP} + X_t^{ICMP} + \ldots$$

wherein $\xrightarrow{BPF}$ is the BPF algorithm, $X_t^{TCP}$ is a TCP traffic sequence split from an original traffic sequence $X_t$, and $X_t^{UDP}$ is a UDP traffic sequence split from the original traffic sequence $X_t$;

calculating a distribution deviation $\tau_{type}^{(i_k^{anom})}$ of different types of data packets under the ICS network data traffic:

$$\tau_{type}^{(i_k^{anom})} = \left( \frac{\left[X_{T_{trai}}^{(i_k^{anom})}\right]_{type} - \left[X_{T_{fore}}^{(i_k^{anom})}\right]_{type}}{\sum_{m=1}^{T_{trai}} X_m^{(i_k^{anom})}} \right)^2 \bigg/ \left( \frac{T_{trai} - T_{fore}}{T_{trai}} \right)^2$$

wherein $[X_t]_{type}$ represents total traffic of a specified type of packet in the ICS communication network traffic sequence $X_t$;

based on the normal traffic training sequence $X'_{N_{trai}}$, calculating a baseline of the distribution deviation by using the BPF, wherein the normal traffic training sequence $X'_{N_{trai}}$ is an offline training set of the trained LSTM deep learning model:

$$Dist_{type} = \left[X'_{N_{trai}}\right]_{type} \bigg/ \sum_{i=1}^{N_{trai}} X'_i$$

(type = UDP, TCP, ARP, etc)

when $\tau_{type}^{(i_k^{anom})}$ satisfies $\tau_{type}^{(i_k^{anom})} > \varepsilon_{type}^{pd} \cdot Dist_{type}^2$, the ICS communication traffic anomaly event is caused by the malicious intrusion attack on the ICS communication network, wherein $\varepsilon_{type}^{ps}$ represents an allowable distribution error of a specified type of packet.

\* \* \* \* \*